United States Patent
Koch et al.

(10) Patent No.: US 10,071,327 B2
(45) Date of Patent: Sep. 11, 2018

(54) FILTER MEDIUM

(71) Applicant: Hydac Filtertechnik GmbH, Sulzbach/Saar (DE)

(72) Inventors: Edwin Koch, Tholey (DE); Matthias Schwender, Kirkel (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 290 days.

(21) Appl. No.: 14/649,984

(22) PCT Filed: Dec. 23, 2013

(86) PCT No.: PCT/EP2013/003937
§ 371 (c)(1),
(2) Date: Jun. 5, 2015

(87) PCT Pub. No.: WO2014/111123
PCT Pub. Date: Jul. 24, 2014

(65) Prior Publication Data
US 2015/0290571 A1    Oct. 15, 2015

(30) Foreign Application Priority Data
Jan. 19, 2013    (DE) .................. 10 2013 000 939

(51) Int. Cl.
*B01D 46/00*    (2006.01)
*B01D 39/14*    (2006.01)
(Continued)

(52) U.S. Cl.
CPC ........... *B01D 39/14* (2013.01); *B01D 39/083* (2013.01); *B01D 39/086* (2013.01); *B01D 39/1623* (2013.01)

(58) Field of Classification Search
CPC .... B01B 1/00; B01B 1/04; B01B 1/46; B01B 1/4609; B01B 1/4618; B01B 1/4636;
(Continued)

(56) References Cited

U.S. PATENT DOCUMENTS 5,385,669 A * 1/1995 Leone, Sr. ........... B01D 29/012
209/319
5,417,793 A * 5/1995 Bakula ................. B01D 29/012
156/208
(Continued)

FOREIGN PATENT DOCUMENTS

DE         100 20 091 C1    8/2001
DE    10 2008 029 443 A1    1/2010
(Continued)

OTHER PUBLICATIONS

Universal Filter, PDF, Accessed Oct. 4, 2017, Copyrite 2011.*

*Primary Examiner* — Allison G Fitzsimmons
(74) *Attorney, Agent, or Firm* — Wenderoth, Lind & Ponack, L.L.P.

(57) ABSTRACT

A filter medium for cleaning fluids includes a filter layer (9) formed from a filter material in a pleated web with a longitudinal direction (X) and a transverse direction (Y). A plastic grid (10) forms a support layer, bears against the filter layer (9) and has linear elements (12, 14) delimiting through openings (16) between them. Two groups of linear elements (12, 14) extend approximately at right angles to one another and delimit rectangular through openings (16). The linear elements (14) having a smaller diameter (d2) are in direct contact with the filter layer (9). The linear elements (12) having a larger diameter (d1) and having a greater spacing from one another relative to the filter layer (9) rest on the smaller diameter linear elements (14).

25 Claims, 4 Drawing Sheets

(51) Int. Cl.
*B01D 39/08* (2006.01)
*B01D 39/16* (2006.01)

(58) Field of Classification Search
CPC .... B01B 1/4681; B01D 29/012; B01D 29/05;
B01D 33/0376; B01D 33/0183; B01D
46/00; B01D 46/0002; B01D 46/0005;
B07B 1/46; B07B 1/00; B07B 1/268;
B07B 1/409; B07B 1/412; B07B 1/397
USPC ....... 210/153, 488, 489, 496, 499, 473, 477,
210/479, 481, 483; 209/13, 155, 158,
209/254, 268, 273, 309; 442/1, 2, 50,
442/181, 327, 335
See application file for complete search history.

(56) References Cited

U.S. PATENT DOCUMENTS

| | | | |
|---|---|---|---|
| 5,744,036 A * | 4/1998 | Choi | B01D 29/012 |
| | | | 156/292 |
| 6,371,302 B1 * | 4/2002 | Adams | B01D 29/012 |
| | | | 209/401 |
| 2007/0090045 A1 | 4/2007 | Bakula | |
| 2010/0108593 A1 | 5/2010 | Chikura et al. | |

FOREIGN PATENT DOCUMENTS

| | | |
|---|---|---|
| DE | 10 2010 025 217 A1 | 12/2011 |
| DE | 10 2010 025 220 A1 | 12/2011 |
| WO | WO 99/26711 A1 | 6/1999 |

* cited by examiner

FILTER MEDIUM

FIELD OF THE INVENTION

The invention relates to a filter medium for cleaning fluids comprising at least one filter layer, formed from a filter material, which specifies a preferably pleated web form of the filter medium having a longitudinal direction and a transverse direction. At least one plastic grid, provided as a support layer, bears against at least one filter layer and has linear elements that delimit through-openings between them.

BACKGROUND OF THE INVENTION

Filter mediums for producing exchangeable filter elements in hydraulic systems are known in many forms and typically comprise a multilayer filter non-woven having a support layer on one or both exterior sides, inflow or outflow sides, of the filter non-woven. Fluid to be cleaned, for example a hydraulic fluid, flows through the filter elements, with a significant pressure difference from the inflow to the outflow sides. To be able to withstand this pressure difference and also dynamic flow forces in the unfiltered fluid, the filter mediums, from which the appropriate filter elements are manufactured, have support layers, also called support structures. The support layers undergo strong pressure changing loads during operation of the filter elements and are made from metal fabric, in particular, fabric made of stainless steel wires or from plastic grids, for example.

The document EP 0 402 099 B1 discloses a reinforced textile material for use for fiber reinforced composite materials, comprising a plurality of warp threads composed of reinforced filament yarns, which extend parallel to each other in a web shape in the longitudinal direction of the reinforcing textile material. The warp threads are disposed in the transverse direction to the reinforced textile, in order to form a section composed of the warp threads having higher density and a section composed of the warp threads having lower density. A plurality of weft threads are composed of reinforced filament yarns, which extend parallel to each other in a web shape in one direction over the warp threads, and extend diagonal to the expansion direction of the warp threads.

With a filter medium disclosed in the document DE 10 2010 025 220 A1, a plastic grid, serving as a support structure, is formed from two groups of linear elements. Between the linear elements through-openings are delimited. One of the groups extends diagonally with a predetermined angle to the longitudinal and transverse directions of the web. The other groups extend parallel to the longitudinal or transverse direction of the web. A uniform shape stability and filtration characteristic of the filter medium are attained over the surface of the plastic grid due to the grid, or respectively screen-shaped arrangement of the linear elements.

The document EP 1 436 062 B1 relates to a filter element for fluids having a filter material and tissue-forming support structure supporting the filter material with respect to the through flow of the filter element, at least on the cleaned side. The support structure is manufactured from a plastic material and has electrically conductive elements. This support structure forms a support fabric that has both metal and plastic threads and lies flat against a filter material. The filter material and the support webs are folded in the shape of a star or pleated. The metal threads extend parallel to the folds of the support web.

A filter medium of the initially named type is known for example from the document, DE 10 2008 029 443 A1. The known filter medium is formed as a type of filter web composed of a first layer support fabric, a second layer as a protective non-woven, a third layer as a main non-woven, possibly a further layer of a subsequent further protective non-woven, and in any event, a fourth layer of a another support tissue. The support webs are composed of individual plastic threads. The linear elements, composed of plastic threads forming the plastic tissue, extend diagonally to the longitudinal and transverse direction of the filter web. The filter web is folded pleat-like into a filter element. The spacings between the linear elements serve as free through-openings for the flow through of the fluid to be filtered.

With the exception of the plastic grid according to the document DE 10 2010 025 220 A1 in which the plastic threads or individual linear elements are securely connected together via junction locations or intersections and yield a flow-through grid structure, the other aforementioned citations refer to metal and/or plastic fabric built as linear elements composed of warp and weft threads. Those treads or linear elements can move with respect to each other within the fabric composite material, such that the through-openings between the threads or linear elements are not constant. In particular, the through-openings can become closed due to the moved tissue composite material to impair both the support properties as well as the permeability of the known tissues serving as a support layer.

SUMMARY OF THE INVENTION

An object of the invention is to provide improved support properties and permeability of a plastic grid serving as a support layer, as well as the property thereof to cling to the filter layer to be encompassed.

This object is basically achieved by a filter medium with two groups of linear elements that extend at nearly right angles to each other and delimit rectangular through-openings.

The individual linear elements form rectangles according to the invention, both sides of which are disposed oblique to the longitudinal and transverse direction. Due to the "tilted" rectangular structure, the filter medium according to the invention minimizes resistance for the fluids flowing through. Thus, fewer turbulences and a lower pressure difference are obtained. With the folding of the filter medium into a filter element and with the folding occurring typically in the transverse direction, the linear elements of both groups are always ideally aligned obliquely to the corresponding fold peak, or fold valley. The arrangement according to the invention of the linear elements of the plastic grid predetermines individual channels for the fluid flowing through, such as a hydraulic fluid. All in all, the support and filtration properties of the filter medium are improved due to the geometry according to the invention of the supporting plastic grid.

The pertinent object is also basically achieved where the linear elements having a smaller diameter are in direct contact with the respective filter layer of the filter medium, and where the liner elements having a larger diameter and a greater spacing from each other than is the case with the linear element having smaller diameter, overlap the aforementioned linear elements at a distance to the associated filter layer.

Within the fixed grid structure, slender threads or linear elements result and lie close to the filter layer, yielding an improved property of the plastic grid to cling to the underlying filter layer of the filter medium and greatly improving the stability of the overall composite of the filter medium. Further, due to the cited support grid composite, the "volume giving" threads or linear elements are oriented toward the drainage side of the filter medium, with the consequence that the thread spacing or the distance between the linear element can be optimized, again significantly improving the drainage ability of the filter medium and its permeability. Due to the arrangement of different thicknesses or diameters of the plastic grid with its fixed junction points, there is an improved adaptability of the plastic grid as a support layer to the respectively occurring fold density and filter fineness for the pleated filter medium.

With pleated filter layers, the linear elements of different diameters have proven to be particularly advantageous insofar as they can intersect with each other at an angle of 50 to 60°, preferably approximately 55°. By virtue of the non-shifting arrangement of the linear elements within the plastic grid, in this respect the shapes of the through-openings for the fluid to be filtered are always held constant so that, even during operation, the permeability and the support properties for the support layer cannot change.

According to a particularly preferred embodiment, the distance between the linear elements having the respectively larger diameter or thickness, as seen in the longitudinal alignment of a respective filter fold of the pleated filter layer, amounts to approximately 8 times to 12 times, preferably 10 times the distance between the linear elements having the respectively smaller diameter or the respectively smaller thickness.

When reference is made in the following to the thickness or the diameter of the linear elements, the diameter specification basically relates to the cylindrical threads as a linear element, seen in cross-section. Alternatively, the thickness specification is based on the largest edge length or view side of a thread cross-section shaped, for example, as a rectangle (also a square) or oval, as seen in cross-section. In this respect, the specification of the diameter or the thickness can be understood as being synonymous in the following description of the invention. Additionally, within the plastic grid, the linear elements of one group can have, in increments, several differing, small diameters or thicknesses. The linear elements of the other group, having larger diameters, can be dimensioned differently for this purpose, also in increments with respect to the cross-section ratios.

The linear elements of one group are each advantageously disposed equidistant to each other, i.e., having the same linear spacing. This spacing results in the advantage that uniform sized through-openings are determined by the plastic grid, and thus, uniform support and filtration properties are attained over the surface of the plastic grid. The through-openings preferably have side lengths in the range of 900 µm to 3000 µm, in particular, a first side length of approximately 915 µm and a second side length of approximately 2908 µm.

The linear elements of the plastic grid can delimit square through-openings, in other words, the first side length and the second side length of the respective through-opening can be selected to be equal. This design of the filter medium according to the invention results in a particularly good combination of support and filtration properties. The linear elements can extend obliquely to the longitudinal and transverse directions at an angle of 45° in flat mat webs such that there is no preferred direction. Typically however, different angles are selected for the oblique setting with respect to the longitudinal and transverse directions, thereby attaining a use-optimized fluid passage.

The thickness of the linear elements can vary. In particular, the linear elements of the first group can have a thickness that is different from the linear elements of the second group. The passage area that fluid can flow through, defined by the through-openings, is further enlarged due to the use of linear elements with different thicknesses. The strength, and consequently the support property, of the plastic grid is determined by the design, in particular the material and the thickness, of the linear elements. The linear elements preferably have a thickness in the range of 300 µm to 450 µm. The linear elements of the first group in particular have a thickness of approximately 419 µm. The linear elements of the second group have a thickness of approximately 330 µm.

The shape stability and filtration characteristics of the filter medium are set according to need by the grid or screen-shaped arrangement of the linear elements. The linear elements of the plastic grid can have a thread shape. Additionally, at least one electrically conductive linear element can be embedded in the plastic grid. The electrically conductive element is preferably formed free of metal and/or contains carbon. Particularly preferred, the respective electrically conductive linear element is formed as a bicomponent fiber having a plastic fiber coated with carbon.

The material of the plastic grid comprises in a preferred manner, polybutylene terephthalate (PBT), polypropylene (PP) and/or polyethylene (PE) plastic. Such plastic materials are characterized by medium strength and a high rigidity and hardness.

Semi-crystalline polyethylene terephthalates have thermal limitations of use at −20° C. and +100° C., momentarily up to +200° C. They are resistant to diluted acids, aliphatic and aromatic hydrocarbons, oils, fats, esters and alcohols. Polybutylene terephthalate, in comparison to polyethylene terephthalate, has a somewhat lower stability, but its temperature limitations lie at approximately −40° C. and +250° C. Isotactic polypropylene can be used up to approximately +150° C. and has proven to be very chemically stable.

The aforementioned and further described features can be implemented in any combination in a filter medium according to the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure are pure schematic and are not to scale.

DETAILED DESCRIPTION OF THE INVENTION

Figure 1:
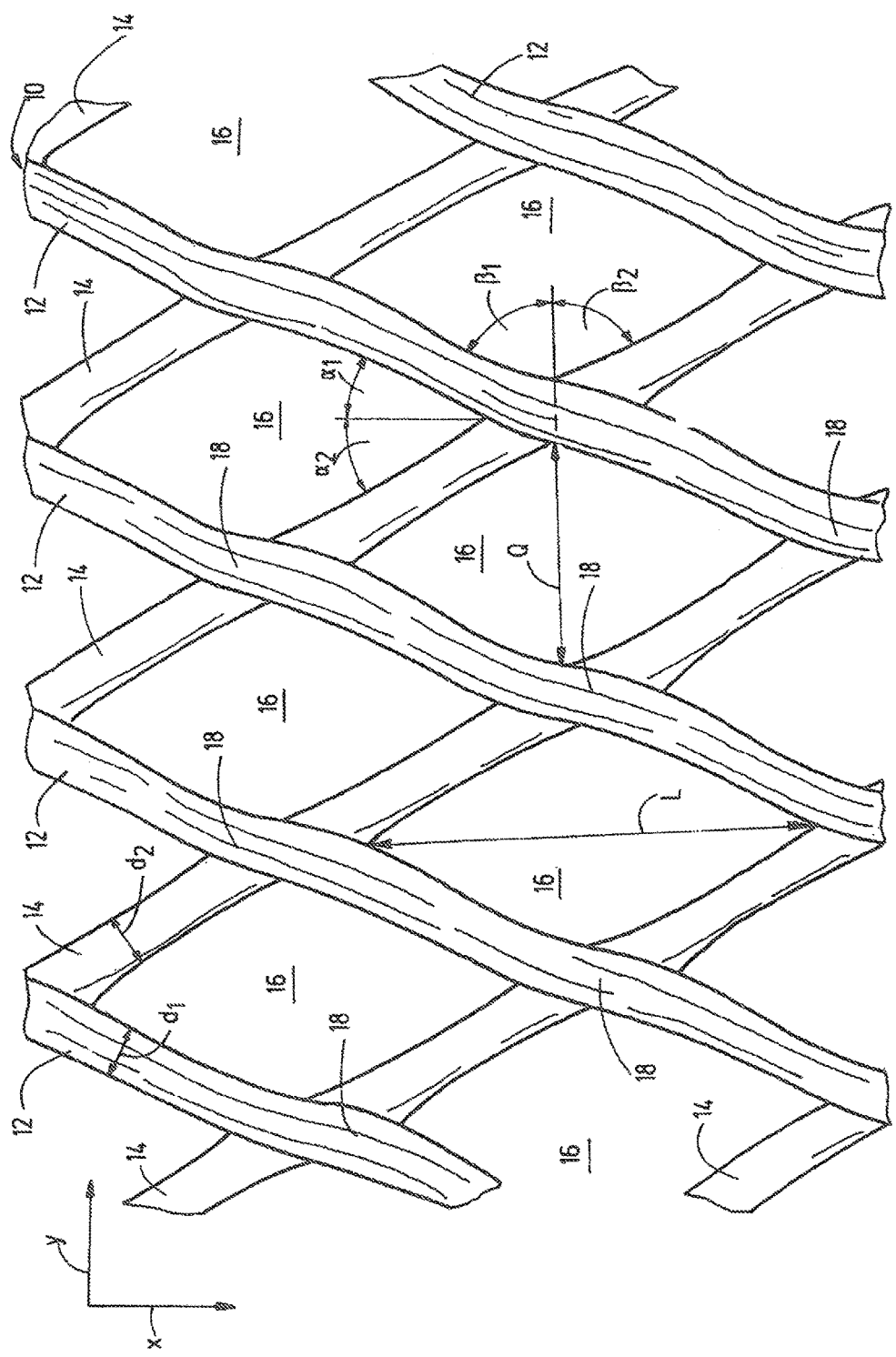
FIG. 1 is a top view of a section of a plastic grid of a filter medium known from the prior art.

FIG. 1 shows a top view of a section of a plastic grid 10 according to the prior art. The plastic grid 10 has substantially the shape of a web with a first group of the first linear elements 12 and a second group of second linear elements 14. The first linear elements 12 extend equidistant, parallel to each other, and are disposed diagonal to the longitudinal direction X, at a first angle α1, and diagonal to the transverse direction Y, at a further first angle β1. Correspondingly, the second linear elements 14 extend parallel to each other and diagonal to both the longitudinal and transverse directions X, Y at second angles α2, β2, respectively.

The linear elements 12, 14 delimit through-openings 16 between each other, which openings are formed substantially uniformly, each having a diamond shape with a first diagonal having a length of L=2431.8 µm and a second diagonal with a length of Q=1273 µm. The structure of the diamond-shaped through-openings 16 is predetermined by the arrangement of the two groups of first and second linear elements 12, 14. With a further processing of the plastic grid 10, the longitudinal direction X specifies a direction for the intake into a folding machine.

The first linear elements 12 have substantially the same thickness $d_1$=298 µm. The second linear elements 14 have a thickness $d_2$=292 µm. In the representation of FIG. 1, the first linear elements 12 bear against the second linear elements 14, and are securely connected to them at intersections 18, in other words fixed to them. However, the linear elements 12, 14 can form the plastic grid 10 as a whole, integrally from a plastic material. The two groups of linear elements 12, 14 are disposed obliquely to each other, and form an acute angle in the longitudinal direction X, the sum of the two angles being α2+α1<90°. In the transverse direction Y, the two groups of linear elements 12, 14 form an obtuse angle, the sum of the further angles being β1+β2>90°. The two groups of the linear elements 12, 14 can be oriented relative to each other in such a manner that an obtuse angle is formed in the longitudinal direction X and an acute and is formed in the transverse direction Y.

Figure 2:
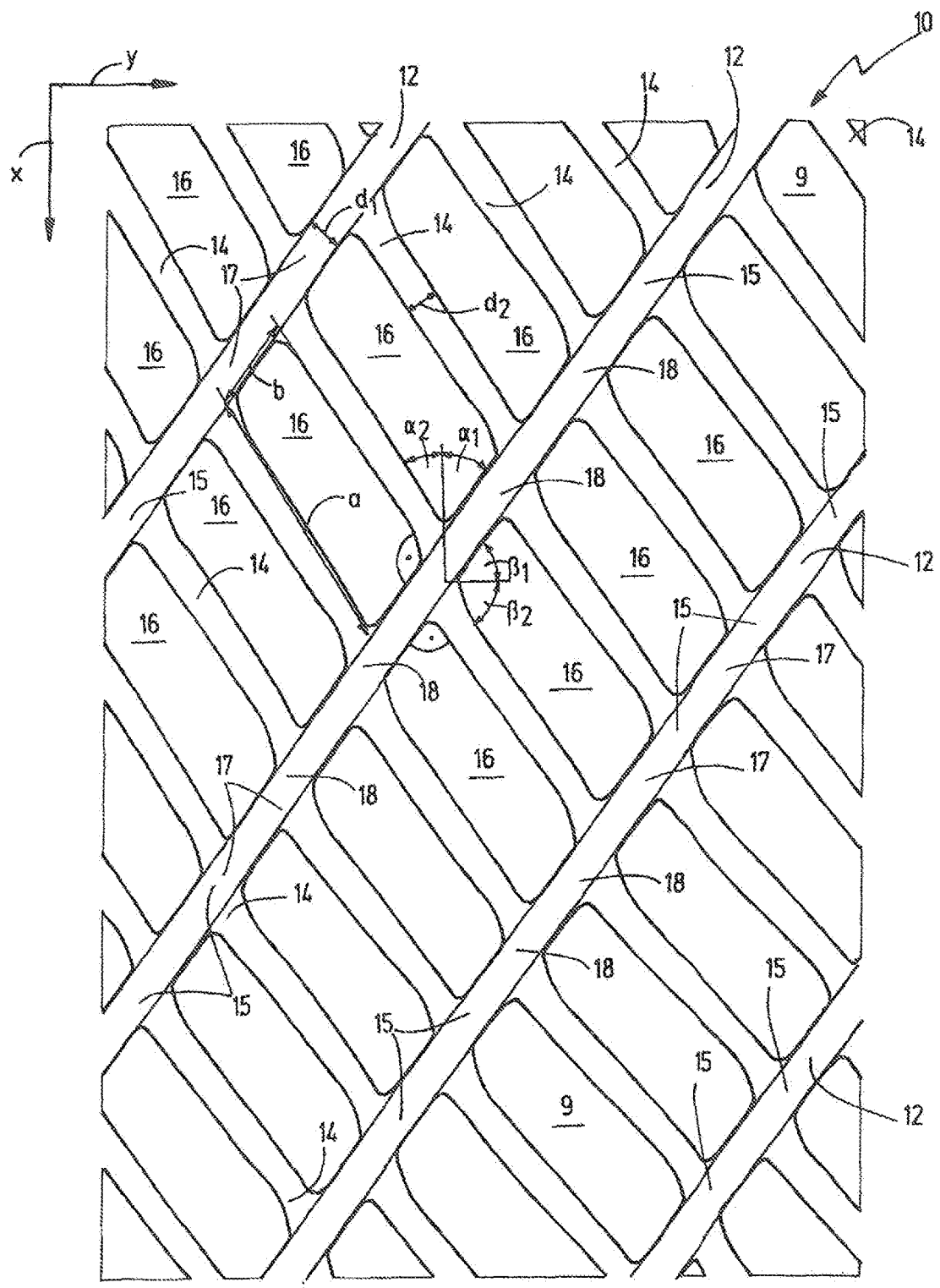
FIG. 2 is a top view of a section of a plastic grid of a filter medium according to an exemplary embodiment of the invention, with filter layers disposed below.

In contrast, FIG. 2 shows a design of the plastic grid 10 according to an exemplary embodiment of the invention with the special feature that the two groups of the linear elements 12, 14 are oriented at right angles to each other. Consequently, the angles α1, α2, β1 and β2, at which the linear elements 12, 14 intersect each other in the longitudinal direction X and the transverse direction Y, in other words, the angles at which they are placed diagonally to each other, are to be selected such that the angles α1, α2, β1, β2 assigned to the respective directions X, Y add up to 90°, i.e., α1+α2=90° and β1+β2=90°. In the example embodiment shown in FIG. 2, the thickness $d_1$ of the first linear element 12 is $d_1$=419 µm; and the thickness $d_2$ of the second linear elements 14 is $d_2$=330 µm. The linear elements 12, 14 in each of the respective groups are disposed equidistant and parallel to each other, such that uniform through-openings 16 are specified, having a first side length a=2908 µm specified by the spacing of the first linear elements 12, and a second side length b=915 µm specified by the spacing of the second linear elements 14. The dimension a×b of the rectangular through-openings 16 defines the surface available for fluid flow through, and consequently the fluid permeability of the plastic grid 10.

Figure 3:
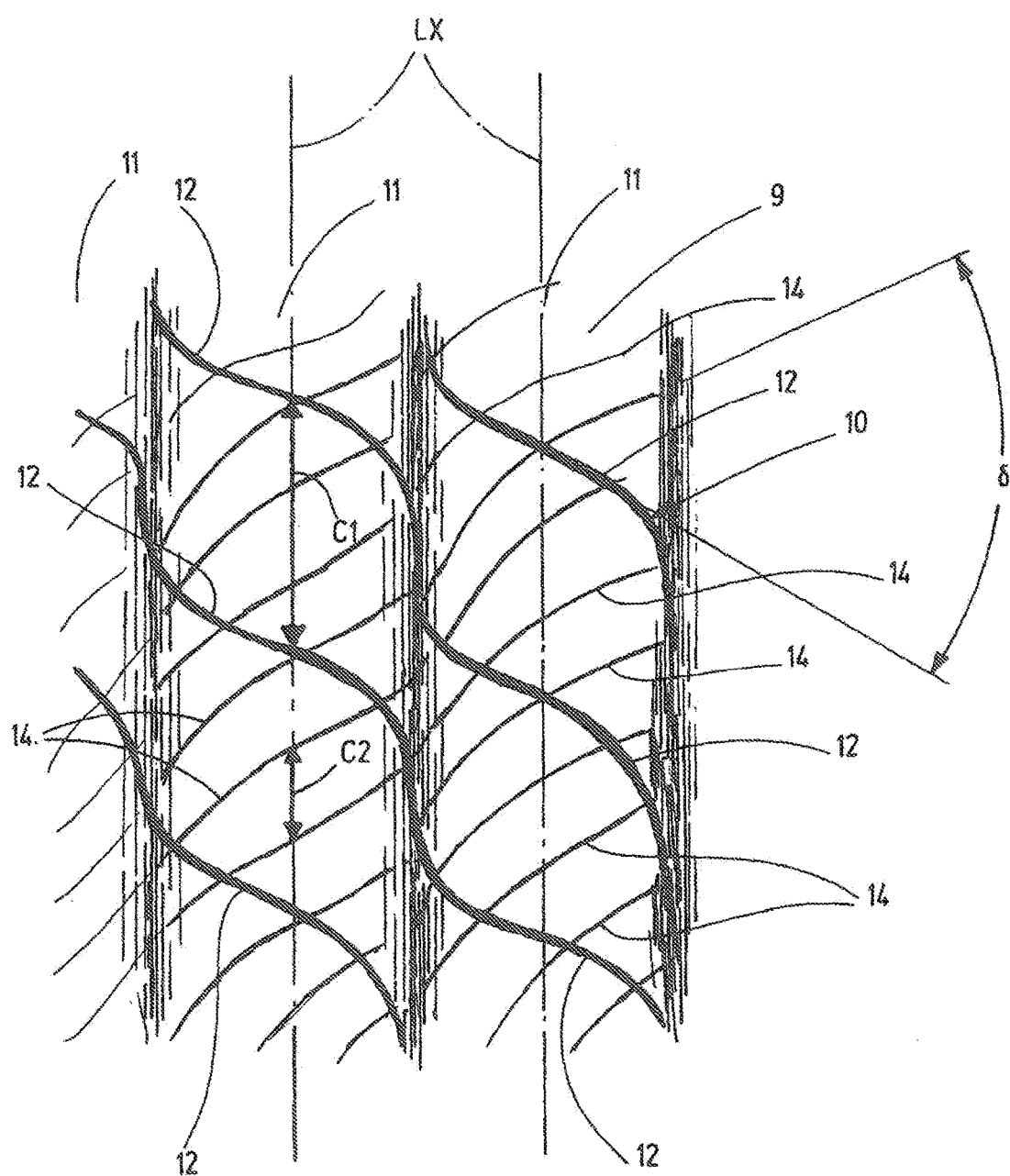
FIG. 3 is a side view of a part of the now pleated filter medium according to FIG. 2.

FIG. 3 shows a pleated filter layer 9, but shows only parts of individual filter folds 11 of a star-shaped folded or pleated filter medium formed into a hollow cylinder of the filter element (not shown). The relevant outer filter layer 9 is surrounded or enveloped by the plastic grid 10 shown two-dimensionally in FIG. 2. The individual filter folds 11 bulge out in a known manner towards the observer of FIG. 3 in mountain bulges. Respectively adjacent filter folds 11 are connected together in the valley floors, likewise in curve-shaped profiles.

The linear elements 14 having the respectively smaller diameter $d_2$ are in direct contact with the respective top or outer side of the filter layer 9 of the filter medium, pleated to this extent. In contrast, the linear elements 12 having respectively a larger diameter $d_1$, having a greater spacing from each other, are disposed over the linear elements 14 with the smaller diameter $d_2$. In this respect, the linear elements 14 have a greater spacing compared to the associated adjacent filter layer 9, and are held via the linear elements 14 at a distance to the filter layer 9. Seen in the inflow direction of the filter material and thus toward the filter layer 9, the thin threads, or the linear elements 14, lying closely together, form an ideal support and protection for the sensitive filter layer 9. In contrast, in the outflow direction, the threads 12, providing volume, form large flow cross-sections at an optimal distance with respect to the filter layer 9, with the consequence that only minimal flow resistances form, such that a type of optimized drainage layer is attained via the support grid 10.

If the filter layer 9 is pleated, in accordance with to the depiction according to FIG. 3, the linear elements 12, 14 of different diameters intersect and enclose between them an imaginary angle δ of 50 to 60°, preferably of approximately 55°. Furthermore, the distance $c_1$ between the linear elements 12 with the respectively larger diameter $d_1$, seen in the longitudinal direction LX on the top side of a respective filter fold 11 of the pleated filter layer 9, is approximately 8- to 12-times, preferably approximately 10-times the distance $c_2$ between the linear elements 14 having the respectively smaller diameter $d_2$. Thus, with this exemplary example embodiment, the distance $c_1$ according to the second side length b is approximately 2908 µm; and the distance $c_2$ according to the first side length a is approximately 915 µm.

As further illustrated in FIGS. 2 and 3, as seen in the viewing direction of FIGS. 2 and 3, the linear elements 12 having the greater thickness $d_1$ are disposed over the linear elements 14 having the smaller thickness $d_2$. If the support grid 10, forming the pleated filter mat, shown in more detail in FIG. 3, is now placed in folds 11, the thicker linear elements 12 lie on top of each other between the adjacent folds 11. Uniform locations of abutment then form, such that the underlying thinner linear elements 14 are then correspondingly distanced from each other by the double thickness or width of the thicker linear elements 12. This way, conductive or drainage channels arise within the respective folds 11, which channels allow the guidance of fluid, relatively free of resistance, within the pleated filter medium. As further shown in FIG. 2, depending on the production method, particularly at the junction or intersection locations 15 of thicker linear elements 12 with the thinner linear elements 14, at every location of an intersection point 15 or undercut, the subsequent section of a linear element 14 is offset to the preceding linear element part by a predetermined distance or offset 17. In the pleated structure of the filter medium, the rectangular through locations 16 between the individual folds then substantially lie on top of each other, such that also in this respect an undisturbed fluid passage is attained through the then adjacent filtering filter material.

Instead of the rectangular through locations 16, square through locations 16 can also be obtained from the plastic grid 10, if every second linear element 14 with the smaller diameter $d_2$ can be appropriately omitted. The offset shown in FIG. 2, at the offset location 17 can also be omitted such that all thinner linear elements 14 are disposed parallel to each other and likewise as with the thicker linear elements 12 within the grid structure 10.

Figure 4:
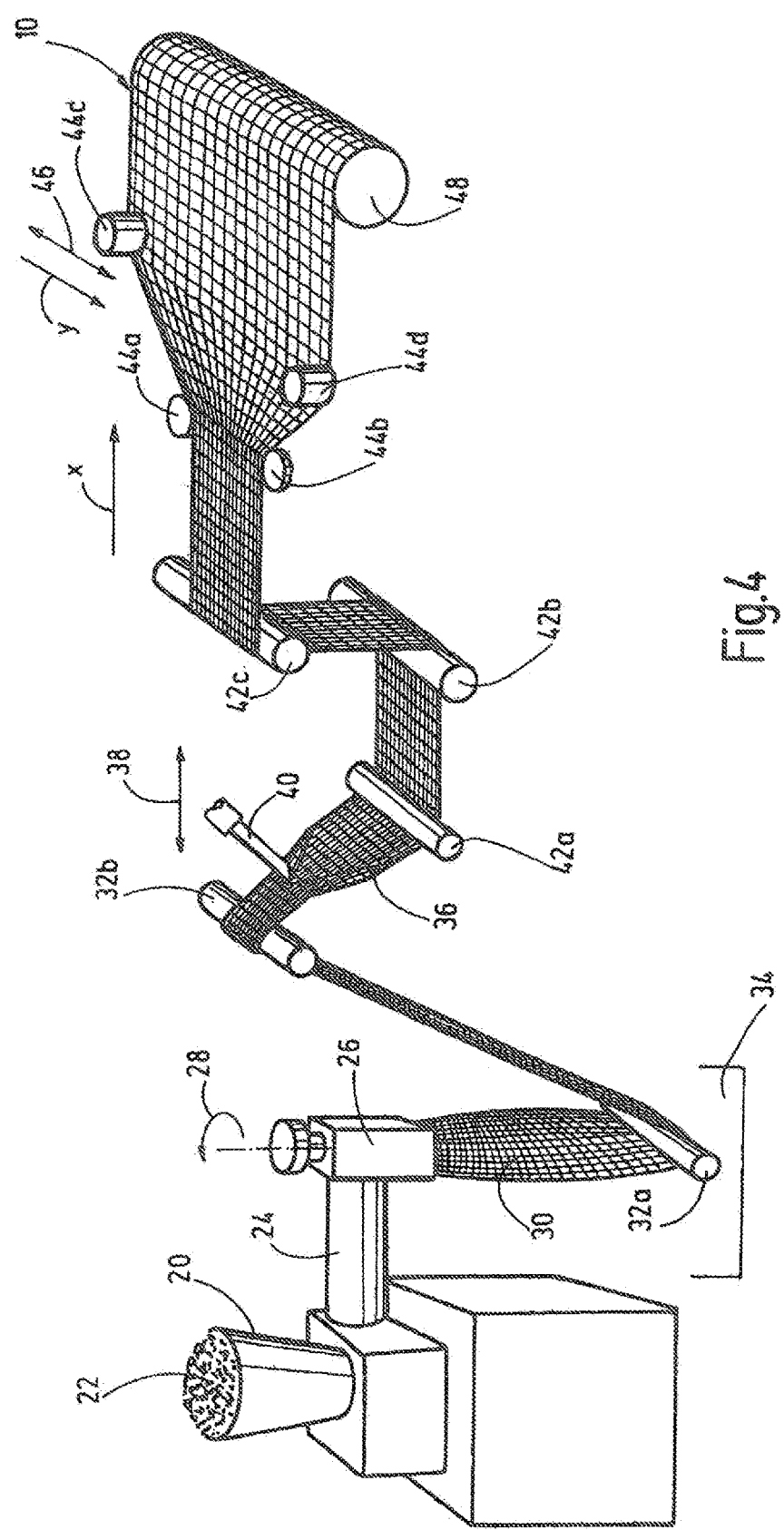
FIG. 4 is a perspective view of an assembly line for producing the plastic grid configured according to the exemplary embodiment of the invention.

A method is sketched out in FIG. 4 for producing the plastic grid 10. Plastic granulate is supplied into an extruder 20, and liquefied there. The liquefied granulate, using a spiral 24, at a discharge 26, at the end of which nozzles, not shown, are located, disposed on rings rotating in opposite directions. Upon passing through the nozzles rotating in or counter to a direction of rotation 28, a hose 30 arises from the liquefied plastic granulate. For cooling, the extruded hose 30 is guided over a deflection roller 32a through a water bath 34.

After a further deflection roller 32b, a longitudinal stretching 38 is performed in the longitudinal direction X of a web 36. The hose 30 further passes through a cutting device 40 and is cut by this device in the longitudinal direction X so that the web 36 is obtained. Via further rollers 42a, 42b, and 42c, which are formed as calender or deflection rollers, the longitudinally stretched web 36 is guided to an arrangement of lateral guide elements 44a to 44d, where a transverse stretching 46 is performed in the transverse direction Y. Parallel thereto, edges are formed on the web 36. The longitudinal stretching 38 and the transverse stretching 46 are selected and performed according to the grid structure to be formed in the web 36, such as the size of the rectangle, setting the diagonal of the groups of linear elements 12, 14 to the longitudinal direction X and the transverse direction Y.

When performing the longitudinal and transverse stretching 38, 46, the plastic material is still not completely hardened, and the web 36 is consequently still highly flexible. The final hardening of the plastic material takes place after the transverse stretching 46. The finished plastic grid 10 is rolled up onto a web roller 48 for storing and/or for transport, and is cut through or separated in the transverse direction Y corresponding to the lengths of the web 36 to be rolled onto the web roller 48. Instead of the web roller 48, a device for connecting the plastic web 10 to a filter layer of the filter medium and/or a folding machine for the filter medium can be adjoined thereto.

While one embodiment has been chosen to illustrate the invention, it will be understood by those skilled in the art that various changes and modifications can be made therein without departing from the scope of the invention as defined in the claims.

The invention claimed is:

1. A filter medium for cleaning fluids, comprising:
a filter medium layer formed into a pleated web having a longitudinal direction and a transverse direction; and
a plastic grid bearing directly against and supporting said filter medium layer, said plastic grid having thinner and thicker linear elements connected together and delimiting through-openings therebetween, said thinner linear elements having transverse diameters smaller than transverse diameters of said thicker linear elements and being in direct contact with said filter medium layer, said thicker linear elements being spaced from one another by distances greater than spacings of said thinner linear elements from one another, being spaced from said filter medium layer by said thinner linear elements at and between intersections of said thinner and thicker linear elements and overlapping said thinner linear elements, each of said through-openings having first and second side lengths in a range of 900 μm to 3000 μm.

2. A filter medium according to claim 1 wherein said first sides have a length of 915 μm; and said second sides have a length of 2908 μm.

3. A filter medium according to claim 1 wherein said thinner and thicker linear elements intersect forming angles of 50 to 60 degrees.

4. A filter medium according to claim 1 wherein said thinner and thicker linear elements intersect forming angles of approximately 55 degrees.

5. A filter medium according to claim 1 wherein distances between said thicker linear elements in said longitudinal direction of said pleated web are approximately eight to twelve times greater than distances between said thinner linear elements in said longitudinal direction at folds of said filter medium layer.

6. A filter medium according to claim 1 wherein distances between said thicker linear elements in said longitudinal direction are approximately ten times greater than distances between said thinner linear elements in said longitudinal direction at folds of said filter medium layer.

7. A filter medium according to claim 1 wherein said through openings have rectangular shapes.

8. A filter medium according to claim 1 wherein said transverse diameters of said thinner and thicker linear elements are in a range of 300 μm two 450 μm.

9. A filter medium according to claim 1 wherein said transverse diameters of said thicker linear elements are approximately 419 μm; and said transverse diameters of said thinner linear elements are approximately 330 μm.

10. A filter medium according to claim 1 wherein said plastic grid comprises at least one of a polybutylene terephthalate, polypropylene or polyethylene plastic.

11. A filter medium according to claim 1 wherein said thinner and thicker linear elements are connected to one another by fixed junctions at intersections thereof, said fixed junctions holding said thinner and thicker linear elements stationary relative to one another at said fixed junctions.

12. A filter medium according to claim 11 wherein said thinner linear elements have offset portions thereof at said fixed junctions, said offset portions being laterally offset relative to adjacent portions of said thinner linear elements by distances corresponding approximately to said transverse diameters of said thinner linear elements.

13. A filter medium for cleaning fluids, comprising:
a filter medium layer formed into a pleated web having a longitudinal direction and a transverse direction; and
a plastic grid bearing directly against and supporting said filter medium layer, said plastic grid having thinner and thicker linear elements connected together and delimiting through-openings therebetween, said thinner linear elements having transverse diameters smaller than transverse diameters of said thicker linear elements and being in direct contact with said filter medium layer, said thicker linear elements being spaced from one another by distances greater than spacings of said thinner linear elements from one another, being spaced from said filter medium layer by said thinner linear elements at and between intersections of said thinner and thicker linear elements and overlapping said thinner linear elements, said transverse diameters of said thinner and thicker linear elements being in a range of 300 μm to 450 μm.

14. A filter medium according to claim 13 wherein said through-openings have first side lengths of 915 μm and second side lengths of 2908 μm.

15. A filter medium according to claim 13 wherein said thinner and thicker linear elements intersect forming angles of 50 to 60 degrees.

16. A filter medium according to claim 13 wherein said thinner and thicker linear elements intersect forming angles of approximately 55 degrees.

17. A filter medium according to claim 13 wherein distances between said thicker linear elements in said longitudinal direction of said pleated web are approximately eight to twelve times greater than distances between said thinner linear elements in said longitudinal direction at folds of said filter medium layer.

18. A filter medium according to claim 13 wherein distances between said thicker linear elements in said longitudinal direction are approximately ten times greater than distances between said thinner linear elements in said longitudinal direction at folds of said filter medium layer.

19. A filter medium according to claim 13 wherein said through openings have rectangular shapes.

20. A filter medium according to claim 13 wherein said transverse diameters of said thicker linear elements are approximately 419 μm; and
said transverse diameters of said thinner linear elements are approximately 330 μm.

21. A filter medium according to claim 13 wherein said plastic grid comprises at least one of a polybutylene terephthalate, polypropylene or polyethylene plastic.

22. A filter medium according to claim 13 wherein said thinner and thicker linear elements are connected to one another by fixed junctions at intersections thereof, said fixed junctions holding said thinner and thicker linear elements stationary relative to one another at said fixed junctions.

23. A filter medium according to claim 22 wherein said thinner linear elements have offset portions thereof at said fixed junctions, said offset portions being laterally offset relative to adjacent portions of said thinner linear elements by distances corresponding approximately to said transverse diameters of said thinner linear elements.

24. A filter medium according to claim 1 wherein said thicker and thinner linear elements extend entirely in planes of respective thicknesses thereof, said planes being perpendicular to longitudinal axes of said thicker and thinner linear elements, respectively.

25. A filter medium according to claim 13 wherein said thicker and thinner linear elements extend entirely in planes of respective thicknesses thereof, said planes being perpendicular to longitudinal axes of said thicker and thinner linear elements, respectively.

* * * * *